(12) United States Patent
Iriguchi et al.

(10) Patent No.: US 6,604,015 B2
(45) Date of Patent: Aug. 5, 2003

(54) NUMERICALLY CONTROLLED SYSTEM AND NUMERICAL CONTROL METHOD

(75) Inventors: Kenji Iriguchi, Tokyo (JP); Kiyotaka Kato, Tokyo (JP); Nobuyuki Takahashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 269 days.

(21) Appl. No.: 09/793,465

(22) Filed: Feb. 27, 2001

(65) Prior Publication Data

US 2001/0021881 A1 Sep. 13, 2001

(30) Foreign Application Priority Data

Mar. 9, 2000 (JP) ........................................ 2000-064465

(51) Int. Cl.[7] ............................................. G05B 19/41
(52) U.S. Cl. ...................... 700/187; 700/160; 700/173; 700/182; 700/190; 700/193; 318/567
(58) Field of Search ................................. 700/187, 160, 700/56, 61, 63, 173, 182, 186–189, 190, 193; 318/578, 570, 567

(56) References Cited

U.S. PATENT DOCUMENTS

| | | | | |
|---|---|---|---|---|
| 5,121,041 A | * | 6/1992 | Matsuura et al. | ............ 318/578 |
| 5,291,393 A | * | 3/1994 | Matsumoto et al. | ........... 700/86 |
| 5,654,618 A | * | 8/1997 | Roper | .......................... 318/578 |
| 5,723,961 A | * | 3/1998 | Fujino et al. | ........... 318/568.15 |
| 5,955,856 A | * | 9/1999 | Sato et al. | .................... 318/560 |
| 6,447,223 B1 | * | 9/2002 | Farah et al. | ................. 409/132 |

OTHER PUBLICATIONS

Shirase et al., "Trial Of NC Programless Milling For A Basic Autonomous CNC Machine Tool", Proceedings of the 2000 Japan–USA Flexible Automation Conference, Jul. 2000, pp. 1–7.

* cited by examiner

*Primary Examiner*—Leo Picard
*Assistant Examiner*—Michael D. Masinick
(74) *Attorney, Agent, or Firm*—Leydig, Voit & Mayer, Ltd.

(57) ABSTRACT

A numerically controlled system includes a tool path sample point setting unit for forming evaluation data by arranging, virtually, a tool on a given scheduled path locus to come precisely into contact with a processed surface of a processing object and by setting tool path sample points to evaluate a shape of the processed surface, a discontinuity portion extracting unit for extracting a discontinuity portion based on the evaluation data, and a tool position data forming unit including a command speed deciding portion for deciding a command speed at which the tool is moved based on the evaluation data and a tool position deciding portion for deciding the tool position based on the command speed and the shape of the worked surface such that the tool comes into contact with the worked surface, wherein setting of the tool path sample points, extraction of the discontinuity portion, and decision of the tool position are carried out in real time.

12 Claims, 18 Drawing Sheets

US 6,604,015 B2

NUMERICALLY CONTROLLED SYSTEM AND NUMERICAL CONTROL METHOD

FIELD OF THE INVENTION

The present invention relates to the improvement of a numerically controlled system and a numerical control method employed to control a machine tool.

DESCRIPTION OF THE RELATED ART

In the prior art, upon working a die or mould having a free-form surface, tool path data are formed representing approximately the tool path by infinitesimal segments such as a straight line, a circular arc, a curve, etc. when the tool is moved virtually by using a CAD/CAM system so as to come into contact with the free-form surface, and then cutting is executed by providing such tool path data to a numerically controlled machine tool.

In recent years, improvement of finishing precision has been requested in such cutting to reduce the burden of a polishing step or to omit the polishing step. In order to enhance the finishing precision of a work piece, a large amount of tool path data is needed and thus time consumed to prepare the tool path data and execute the cutting based on the tool path data is increased.

FIGS. 19A to 19C are schematic views showing a working method by a numerically controlled machine tool in the prior art. FIG. 19A is a schematic perspective view showing the working path, FIG. 19B is a schematic sectional view showing the working path based on the first tool path data being output from the CAD/CAM system, and FIG. 19C is a schematic sectional view showing the working path based on the second tool path data being output from the CAD/CAM system.

In FIGS. 19A to 19C, a work piece 2 has a first worked portion 3 and a second worked portion 4. The case is assumed where curved surfaces 3a, 4a are formed on the first and second worked portions 3, 4 by the cutting of the tool T of the numerically controlled machine tool (not shown) As shown in FIGS. 19A to 19C, the curved surfaces 3a, 4a to be formed by the working (in some cases, referred simply to as "worked curved surfaces" or "curved surfaces" hereinafter) intersect with each other by an angle that is larger slightly than a right angle.

The tool path data output from the CAD/CAM system are transferred to the numerically controlled system. The numerically controlled system prepares interpolation data and then controls the tool based on the interpolation data. Here it is assumed that the scheduled path locus along which the tool is moved is zigzag in the XY plane. That is, the working is performed along a zigzag path changing direction at a predetermined pitch by moving the tool through the path OR1 in FIG. 19A until the end point and then moving the tool to the left side in FIG. 19A via the path OR2.

When the tool traces the path OR1, the tool path data that give the path c11 by providing the tool offset to the curved surfaces 3a, 4a are output from the CAD/CAM system and then the working object is worked based on the tool path data. Also, when the tool traces the path OR2, the tool path data that give the path c21 by providing the tool offset to the curved surfaces 3a, 4a are output and then the working object is worked based on the tool path data.

The tool path data are formed such that the error from the ideal path of the tool (referred simply to as "ideal path" hereinafter) required from the shape of the worked curved surface based on the curved surface data can be reduced to less than the set error e. Accordingly, there exists an error e from the ideal path, at the maximum. For example, when the tool traces the path OR1, the path c11 generated based on the tool path data is given as shown in FIG. 19B with respect to the ideal path c10. Therefore, the coordinates of the point p11 positioned on the left side rather than the intersecting portion C are output in the neighborhood of the intersecting portion C between the curved surface 3a and the curved surface 4a, and thus the maximum error e from the ideal path c10 for the curved surface 4a is generated in the neighborhood of the intersecting portion C.

Also, when the tool traces the path OR2, the path c21 generated based on the tool path data is given as shown in FIG. 19C with respect to the ideal path c20. Therefore, the coordinates of the point p22 positioned on the right side, rather than the intersecting portion C, are output in the neighborhood of the intersecting portion C between the curved surface 3a and the curved surface 4a. As described above, the tool traces either the path c21 or the path c22, and displacement from the ideal path c10 or c20 is different in the neighborhood of the intersecting portion C.

Accordingly, when the working is executed in sequence in a zigzag fashion as above, in some cases the level difference corresponding to the set error e is caused between adjacent paths c11, c21 at the corner portion at which the curved surfaces intersect with each other. Thus, sometimes, that level difference becomes a problem in the working quality since it looks like a groove-like crack or a string-like projection.

In order to prevent such phenomenon, the working precision must be improved by reducing the set error e. In order to increase the working precision, the tool path data output from the CAD/CAM system must be set to be more faithful to the worked curved surface by increasing the amount of data.

Since the above control method is employed in the prior art, the amount of tool path data must be largely increased to assure working quality. Thus, following problems are caused correspondingly.

a. Time required to form the tool path data by the CAD/CAM system and output them is increased.

b. The amount of tool path data transferred to the numerically controlled system become enormous.

c. The working speed cannot be increased since the amount of tool path data is large.

d. If correction of the tool diameter is needed because of tool wear or tool exchange, an enormous amount of tool path data must be calculated again by the CAD/CAM system.

SUMMARY OF THE INVENTION

The present invention has been made to overcome above problems, and it is an object of the present invention to provide a numerically controlled system and a numerically controlling method capable of improving the working quality without degradation of the operation efficiency.

In order to achieve the above object, a numerically controlled system of the present invention comprises evaluating means for forming evaluation data, by arranging virtually a process applying portion of a system to be numerically controlled on a given scheduled path locus to come into contact with a processed surface of a processing object and by setting a plurality of evaluation points to evaluate a shape of the processed surface; discontinuity portion extracting means for extracting a discontinuity portion of a shape of the processed surface based on the evaluation data; and process applying portion position data forming means for calculating a process applying portion position by arranging virtually the process applying portion such that a moving speed of the process applying portion is decelerated to a predetermined speed in a neighborhood of the discontinuity portion and the process applying portion comes into contact with the processed surface, and then providing this calculated process applying portion position to the system to be numerically controlled.

Therefore, since the process applying portion position is calculated by arranging virtually the process applying portion such that the moving speed of the process applying portion is decelerated into the predetermined speed in the neighborhood of the discontinuity portion by extracting the discontinuity portion and the tool comes into contact with the processed surface, the process applying portion position in the neighborhood of the discontinuity portion becomes more faithful to the shape of the processed surface of the processing object and also the working quality can be improved. Also, since the process applying portion position is decided such that the process applying portion comes virtually into contact with the processed surface of the processing object, the increase of the data amount can be suppressed and the reduction in the operation efficiency can be prevented.

Also, the operations of the evaluating means, the discontinuity portion extracting means, and the process applying portion position data forming means are executed in real time.

Therefore, the overall processing time can be shortened by executing these operations in real time and thus the productivity can be improved.

In addition, the discontinuity portion extracting means extracts the discontinuity portion based on three successive evaluation points or more.

Therefore, the discontinuity portion can be extracted by a simple method.

Further, the discontinuity portion extracting means extracts the discontinuity portion based on an angle between a first vector pointing from a first evaluation point to a second evaluation point and a second vector pointing from a third evaluation point to a fourth evaluation point, and first to fourth evaluation points consist of four successive evaluation points.

Therefore, the discontinuity portion can be easily extracted by such simple method.

Furthermore, the discontinuity portion extracting means extracts the discontinuity portion based on a direction of a first difference vector between a first unit vector pointing from a first evaluation point to a second evaluation point and a second unit vector pointing from the second evaluation point to a third evaluation point and a direction of a second difference vector between the second unit vector and a third unit vector pointing from the third evaluation point to a fourth evaluation point, and first to fourth evaluation points consist of four successive evaluation points.

Therefore, the level difference portion as the discontinuity portion can be easily extracted.

Besides, the discontinuity portion extracting means calculates a first curvature vector in a neighborhood of three evaluation points of first, second, and third evaluation points out of four successive evaluation points and a second curvature vector in a neighborhood of three evaluation points of second, third, and fourth evaluation points, and then extracts the discontinuity portion based on the first curvature vector and the second curvature vector.

Therefore, the discontinuity portion can be easily extracted by taking account of the curvature vectors.

Moreover, the numerically controlling method of the present invention comprises the steps of forming evaluation data by arranging virtually a process applying portion of a system to be numerically controlled on a given scheduled path locus to come into contact with a processed surface of a processing object and by setting a plurality of evaluation points to evaluate a shape of the processed surface; extracting a discontinuity portion of a shape of the processed surface based on the evaluation data; calculating a process applying portion position by arranging virtually the process applying portion such that a moving speed of the process applying portion is decelerated to a predetermined speed in a neighborhood of the discontinuity portion and the process applying portion comes into contact with the processed surface; and providing this calculated process applying portion position to the system to be numerically controlled.

Therefore, since the process applying portion position is calculated by arranging virtually the process applying portion such that the moving speed of the process applying portion is decelerated into the predetermined speed in the neighborhood of the discontinuity portion by extracting the discontinuity portion and the tool comes into contact with the processed surface, the process applying portion position in the neighborhood of the discontinuity portion becomes more faithful to the shape of the processed surface of the processing object and also the working quality can be improved. Also, since the process applying portion position is decided such that the process applying portion comes virtually into contact with the processed surface of the processing object, the increase of the data amount can be suppressed and the reduction in the operation efficiency can be prevented.

DETAILED DESCRIPTION OF THE PREFERRED EMBODIMENTS

Now, a description will be given in more detail of preferred embodiments of the invention with reference to the accompanying drawings.

Embodiment 1

Figure 1:
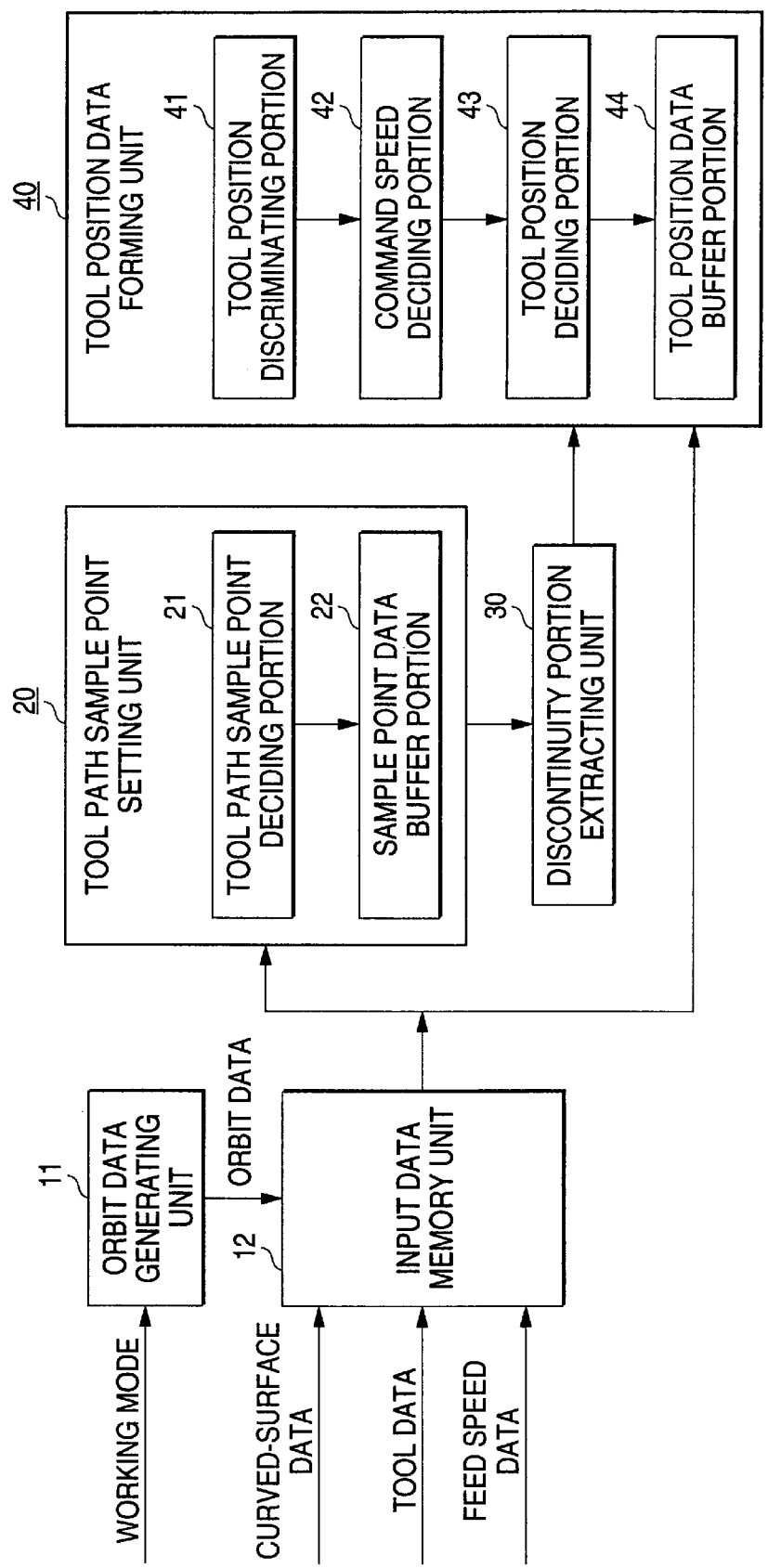
FIG. 1 is a block diagram showing a configuration of a numerically controlled system according to an embodiment of the present invention.

FIG. 1 is a block diagram showing a configuration of a numerically controlled system according to an embodiment of the present invention. In FIG. 1, an orbit data generating unit 11 generates orbit data, that define scheduled path locus on an XY plane on which the tool of the numerically controlled machine tool should be moved, based on the moving mode, i.e., the working mode by which the curved-surface should be worked, and then outputs the orbit data to an input data memory unit 12. Details of the scheduled path locus will be described later.

The curved-surface of the working object is an example of the processed surface of the processing object in the present invention. The numerically controlled machine tool to be numerically controlled is an example of the system to be numerically controlled in the present invention. The tool is the process applying portion of the system to be numerically controlled in the present invention.

The input data memory unit 12 stores input data such as the orbit data generated by the above orbit data generating unit 11, three-dimensional curved-surface data, too data, feed speed data, etc., that are necessary for the numerically controlled working. Where the above curved-surface data represent shapes of the worked surface of the working object, and contain NURBS (Non Uniformed Rational B-Spline) curved-surface, etc. In the case of this NURBS curved-surface, rank, knot vector, control point, and weight are input as the curved-surface data. But any curved-surface data may be employed.

Data such as tool type, e.g., ball end mill, flat end mill, radial end mill, etc., tool diameter of the tool, etc. are input as the tool data. The feed speed data means a user set speed that is the tool feed speed set by the user. The user set speed fu can be set within the range of the allowable speed of the machine.

Figure 8:
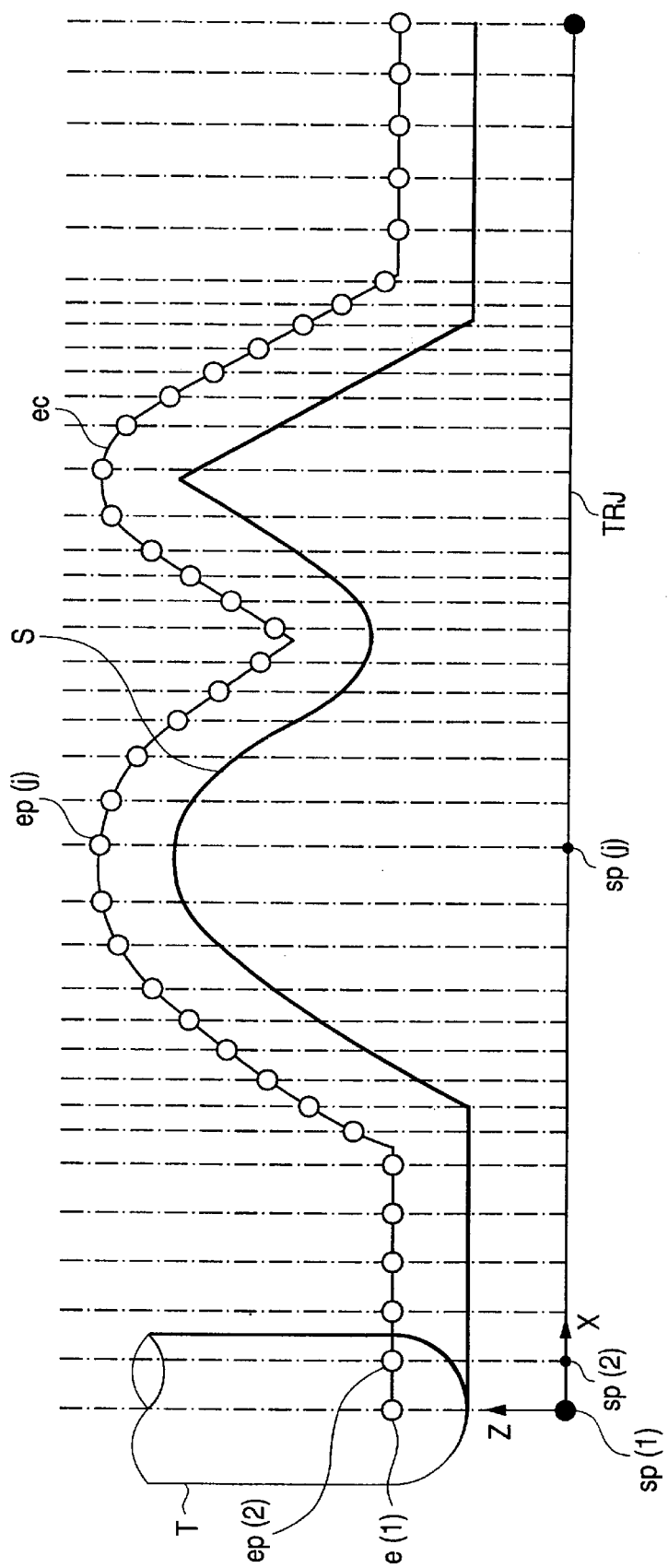
FIG. 8 is a view showing the tool path sample points in curved surface working in FIG. 7.

A tool path sample point setting unit 20 as an evaluating means comprises a tool path sample point deciding portion 21, and a sample point data buffer portion 22. The tool path sample point deciding portion 21 decides the tool path sample points as evaluation points based on the curved-surface data to evaluate the curved-surface to be worked successively. The sample point data buffer portion 22 stores temporarily a plurality of tool path sample points that are decided by the tool path sample point deciding portion 21.

Where the tool path sample point means the tool position obtained when the tool is virtually arranged on X, Y coordinates of the sampling points on the scheduled path locus to come just into contact with the curved-surface (see sampling points sp(1), sp(2), . . . , sp(n), tool path sample points ep(1), ep(2), . . . , ep(j) in FIG. 8 described later).

A discontinuity portion extracting portion 30 extracts discontinuity portions in the tool path based on the tool path sample points set by the tool path sample point setting unit 20. A tool position data forming unit 40 serving as the process applying portion position data forming unit forms the tool position data based on the curved surface data stored in the input data memory portion 12. The tool position data are collection of the X, Y, Z axis coordinates representing the tool position that are output at a predetermined time interval by the numerically controlled system.

Now a detailed configuration of the tool position data forming unit 40 will be explained hereunder. The tool position data forming unit 40 includes a tool position discriminating portion 41, a command speed deciding portion 42, a tool position deciding portion 43, and a tool position data buffer portion 44. The tool position discriminating portion 41 discriminates whether or not the currently observed tool position (referred to as a "current tool position" hereinafter) is located in the vicinity of the discontinuity portion extracted by the discontinuity portion extracting portion 30, then issues the deceleration command if the current tool position is located in the vicinity of the discontinuity portion, and then issues the speed return command after the current tool position has passed through the vicinity of the discontinuity portion. The command speed deciding portion 42 decides the command speed in compliance with the deceleration command or the speed return command.

The tool position deciding portion 43 decides the tool position as the time-series tool position coordinates, that the tool must trace in sequence when the curved-surface is worked, based on the curved-surface data and the command speed. The tool position data buffer portion 44 stores temporarily the tool position decided by the tool position deciding portion 43 and sends it to a servo control portion (not shown) as occasion demands.

The detailed configuration of the tool position data forming unit 40 is described as above.

Based on the tool position data received from the tool position data buffer portion 44 of the tool position data forming unit 40 as the digital signals representing the tool position, the servo control portion (not shown) calculates pulse numbers ΔX, ΔY, ΔZ, that are equivalent to tool moving values in the X, Y, Z axis direction respectively, from differences between the coordinates of the currently observed tool position and the coordinates of the succeeding tool position, and then controls a servo motor.

In the above configuration, the data of the tool path sample points are sequentially stored to the predetermined number while forming the tool path sample point data by the tool path sample point setting unit 20, and the discontinuity portions are extracted by the discontinuity portion extracting portion 30 while using the predetermined number of data. Then, the tool position data are formed by the tool position data forming unit 40. The above operations are carried out in real time, nevertheless setting of the tool path sample points by the tool path sample point setting unit 20 and extraction of the discontinuity portions by the discontinuity portion extracting portion 30 are executed somewhat prior to formation of the tool position data by the tool position data forming unit 40.

Figure 2:
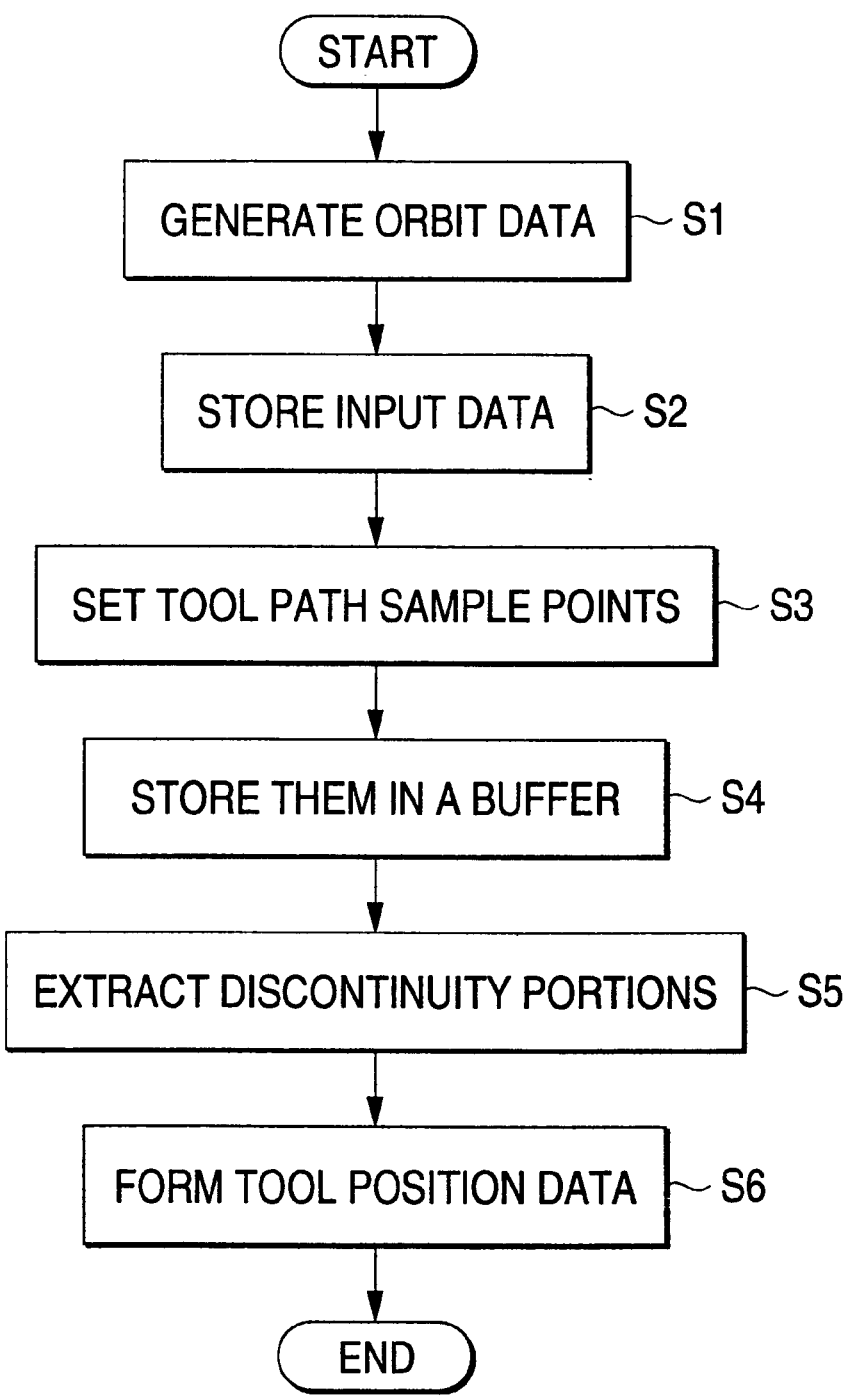
FIG. 2 is a flowchart showing an operation of the numerically controlled system.
Figure 3A:
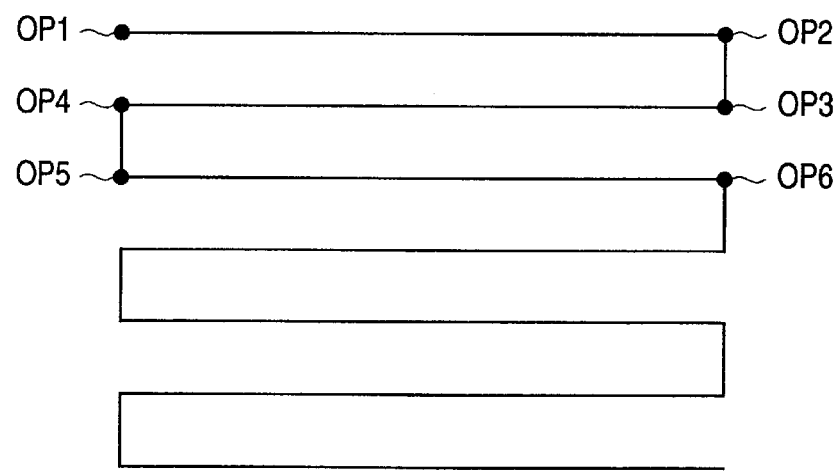
FIGS. 3A and 3B are views showing an example of working modes.
Figure 3B:
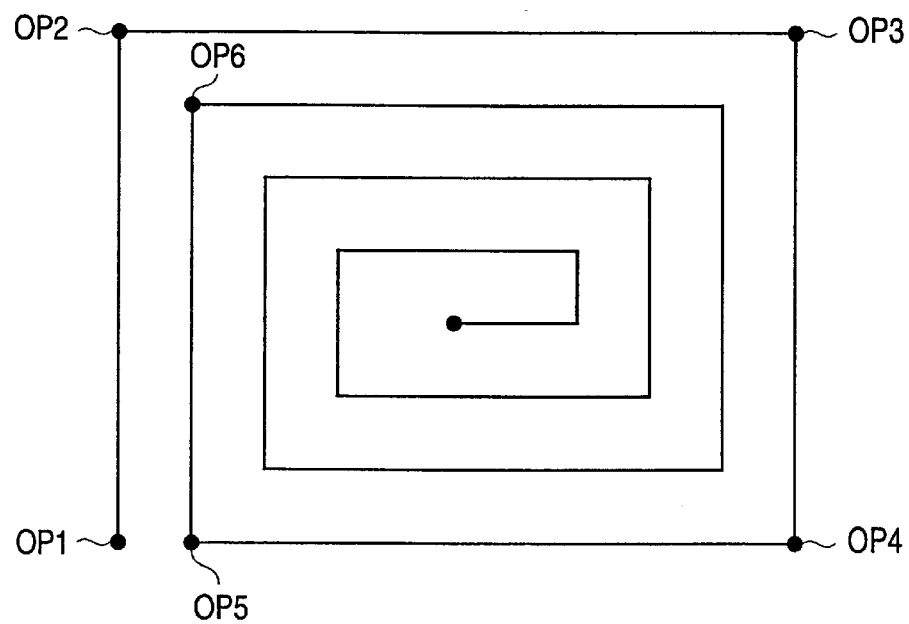
Figure 4:
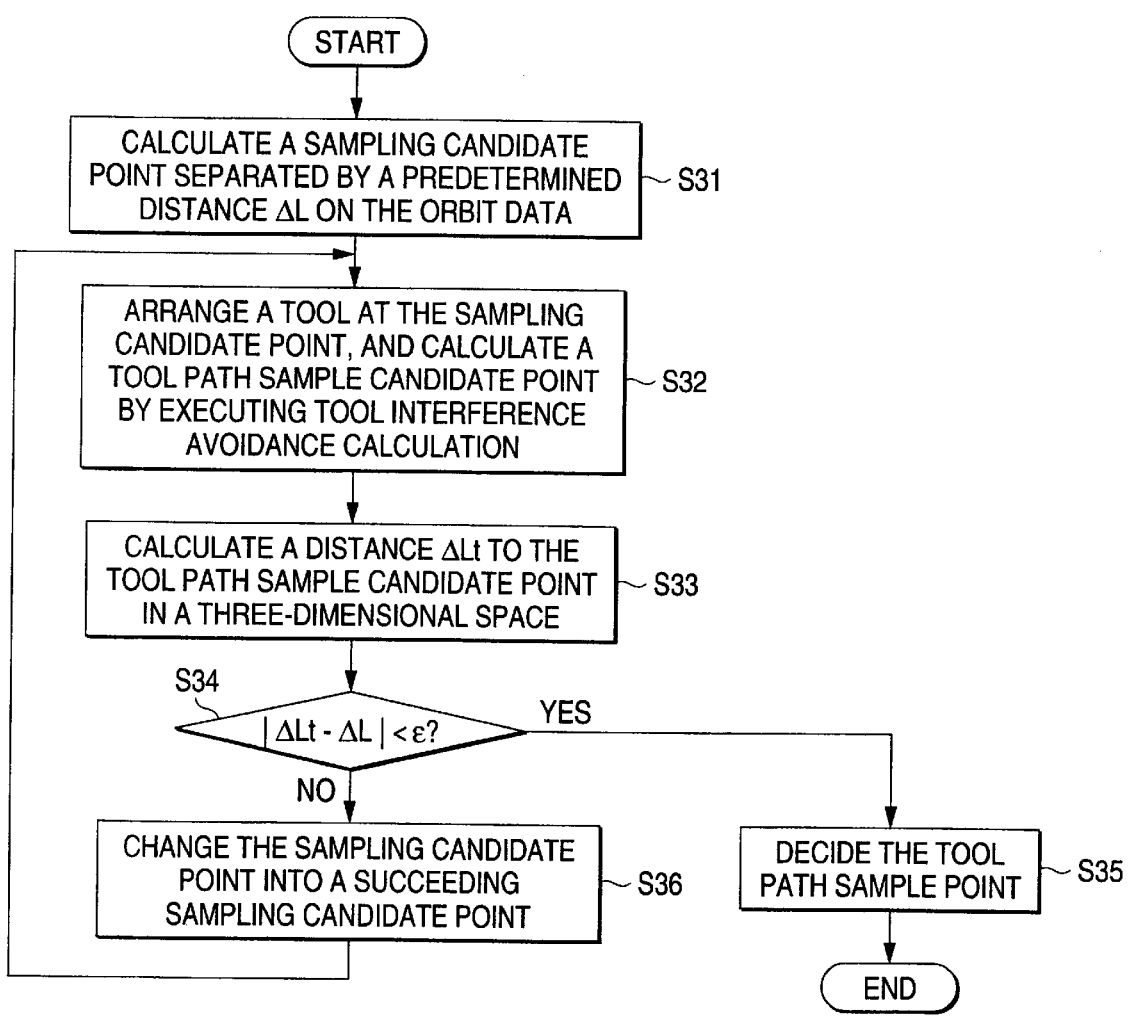
FIG. 4 is a flowchart showing a detailed operation of a tool path sample point setting unit.

Next, an operation will be explained hereunder. First an overall rough operation will be explained, and then detailed operations of respective portions will be explained. FIG. 2 is a flowchart showing an overall operation of the numerically controlled system. FIGS. 3A and 3B are views showing an example of the scheduled path locus. FIG. 4 is a flowchart showing an operation of the tool path sample point setting unit 20 in FIG. 1.

Figure 5A:
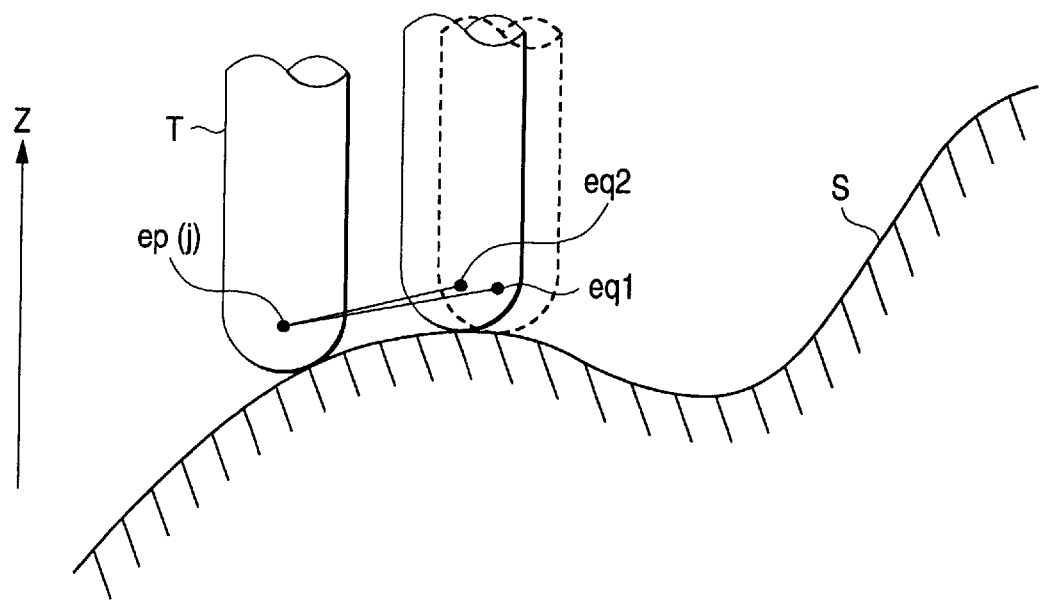
FIGS. 5A and 5B are views showing a concept of a process to calculate a succeeding tool path sample point separated by a distance ΔL.
Figure 5B:
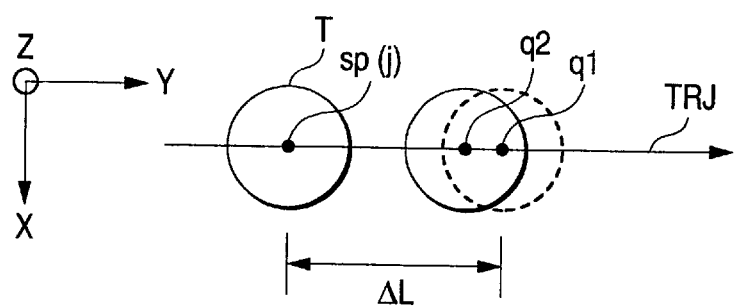
Figure 6A:
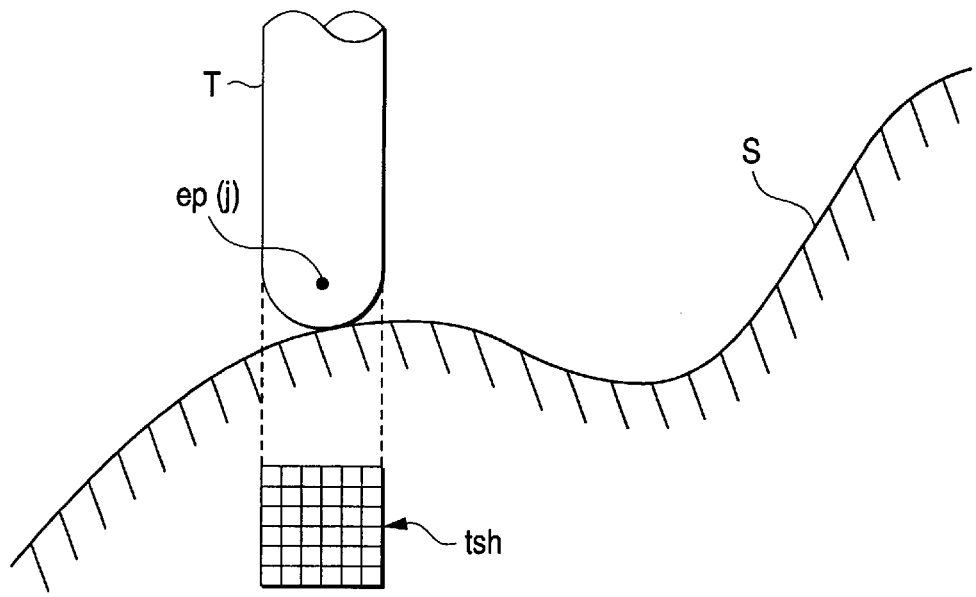
FIGS. 6A and 6B are views showing a concept of a normal method of tool interference avoidance.
Figure 6B:
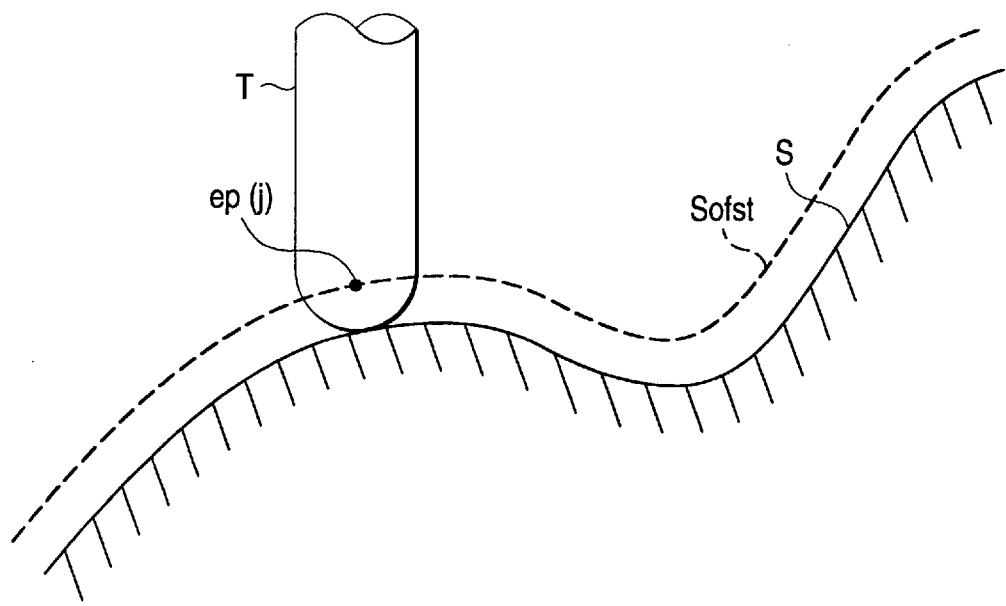
Figure 7:
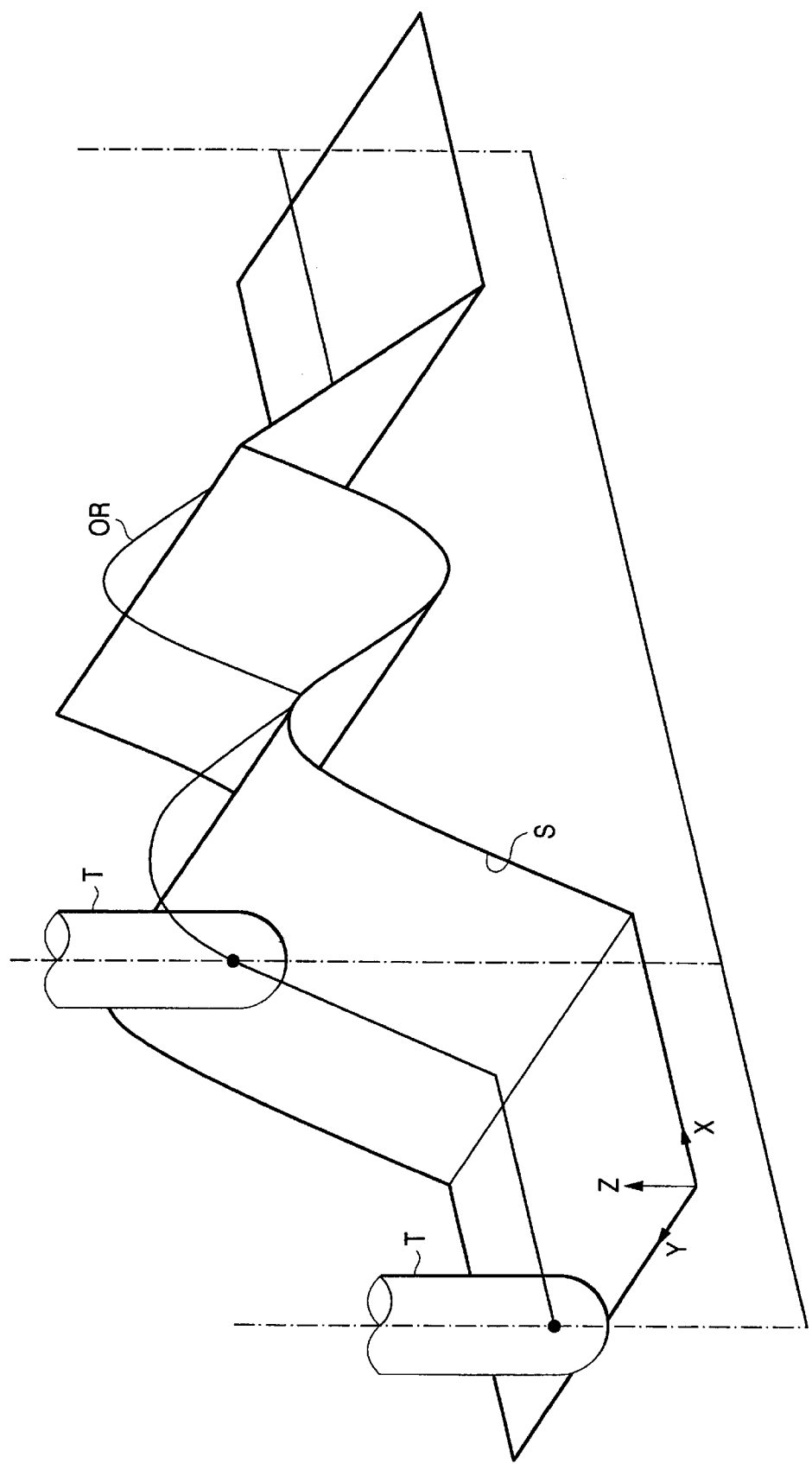
FIG. 7 is a view showing a relationship between a curved surface and a tool path.

FIGS. 5A and 5B are views showing a concept of a process to calculate the succeeding tool path sample point separated from the current tool path sample point on the curved surface by a distance $\Delta L$, wherein FIG. 5A shows a YZ plane and FIG. 5B shows an XY plane. FIGS. 6A and 6B are views showing an example of the tool interference avoidance calculation. FIG. 7 is a view showing a relationship between the curved surface and the tool path. FIG. 8 is a view showing the set tool path sample points.

First, the overall operation will be explained with reference to the flowchart in FIG. 2.

In step S1, the orbit data generating unit 11 generates the orbit data based on the given working mode. The working mode must be set to work the curved-surface. In step S1, the orbit data are generated based on this set working mode.

The orbit data are data indicating how the tool should be moved. Here, the orbit data generating unit 11 generates the orbit data as the data indicating the scheduled path locus on the XY-plane in answer to the working mode. As the working mode, there are a zigzag working mode, a spiral working mode, a spline working mode, a circular arc working mode, etc.

FIGS. 3A and 3B show such working modes, wherein FIG. 3A shows an example of the zigzag working mode of the scheduled path locus that is defined in a zigzag fashion on the XY-plane, and FIG. 3B shows the spiral working mode of the scheduled path locus that is defined spirally on the XY-plane.

If the working mode is set by giving the data such as a pitch, etc., the scheduled path locus can be obtained as the orbit on the XY-plane such as a point OP1 to a point OP2, the point OP2 to a point OP3, the point OP3 to a point OP4, . . . in FIGS. 3A or 3B.

The input data memory unit 12 stores the input data such as the orbit data input from the orbit data generating unit 11, the curved-surface data, the tool data, the feed speed data, etc. (step S2). The tool path sample point setting unit 20 sets the tool path sample points in response to the positions of respective portions of the curved surface to extract the discontinuity portions on the curved-surface to be succeedingly worked, based on the curved-surface data stored in the input data memory unit 12, and then stores them in the sample point data buffer portion 22 (steps S3, S4).

Then, a detailed operation in step S3 will be explained with reference to a flowchart in FIG. 4 hereunder.

First, in step S31 in FIG. 4, a tool path sample point is set in response to the sampling point on the scheduled path locus TRJ (in this example, a straight line). Here, as shown in FIG. 5B, it is assumed that the current sampling point is a point sp(j) on the scheduled path locus TRJ on the XY-plane, and the tool path sample point in the three-dimensional space at this time is a point ep(j).

Then, the sampling candidate point q1 separated from the current sampling point sp(j) on the scheduled path locus TRJ by a predetermined distance $\Delta L$ is calculated as shown in FIG. 5B (step S31 in FIG. 4).

Then, the tool T is virtually arranged on the X, Y axis coordinates of the sampling candidate point q1 calculated in above step S31 from the upper side in FIG. 5A such that such tool does not interfaces with the curved-surface S but comes into contact with the curved surface S, and then the tool interference avoidance calculation is executed (step S32). The tool position at this time is called a tool path sample candidate point eq1.

Details of the tool interference avoidance calculation in step S32 will be given as follow. FIGS. 6A and 6B are views showing a concept of an ordinary method of the tool interference avoidance calculation. The problem of this tool interference avoidance calculation is concluded as the problem to detect the Z axis coordinate contacting first to the curved surface S when the X, Y axis coordinates are set, then the tool T is arranged over the curved surface S on the X, Y axis coordinates, and then the tool T is put down gradually toward the curved surface S.

As shown in FIG. 6A, the tool can be set not to interface with the curved surface by virtually projecting the tool T onto the objective curved surface, then checking the interference between a number of sample points tsh (represented by a square mesh in FIG. 6A, for the sake of simplicity) on the curved surface S to which the tool T is projected and the tool T, and then calculating the coordinates of the tool position ep(j) as a center of the tool when the tool T comes into contact with the curved surface S.

The point calculated by such method such that the tool does not interface with the curved surface is the tool path sample candidate point eq1.

Then, in step S33, a distance $\Delta Lt$ between the current tool position ep(j) and the tool path sample candidate point eq1 in the three-dimensional space is calculated. Then, it is decided whether or not a difference between the distance $\Delta Lt$ and the distance $\Delta L$ used in step S301 is less than a predetermined previously decided infinitesimal value $\epsilon$ (step S34). As a result, if the difference between the distance $\Delta Lt$ and the distance $\Delta L$ is smaller than the infinitesimal value $\epsilon$, the tool path sample candidate point eq1 is decided as the succeeding evaluation point ep(j+1)(step S35).

In contrast, if the difference between the distance $\Delta Lt$ and the distance $\Delta L$ exceeds the infinitesimal value $\epsilon$, the distance $\Delta Lt$ is too far to employ. Therefore, the sampling candidate point is changed into another sampling candidate point q2, for example, that is closer to the point sp(j) than the candidate point q1, on the scheduled path locus TRJ on the XY-plane (step S36), and then the process returns to step S32. Then, the tool path sample candidate point eq2 that is smaller than the infinitesimal value $\epsilon$ is found by executing steps S32 to S34, and then this tool path sample candidate point eq2 is decided as the tool path sample point (step S35).

In order to calculate another sampleing candidate point q2 on the scheduled path locus TRJ on the XY-plane, the dichotomy may be employed, for example. According to the above calculation, the point eq1 or the point eq2 that is closest to the distance $\Delta L$ can be obtained as the succeeding sampling point.

The above explanation is the operation of the tool path sample point deciding portion 21 in step S3 (FIG. 2), and the tool path sample point can be derived as described above.

The process to get the tool path sample point is totally similar to the process to calculate the tool position described later.

As the method of avoiding the interference between the tool and the curved surface, as shown in FIG. 6B, in addition to the above-mentioned method, the tool can be prevented from interfering with the curved surface by calculating an offset curved surface Sofst of the curved surface S and then deriving the coordinates of the center position ep(j) of the tool T from this offset curved surface Sofst.

In addition, as other interference preventing method, the method set forth in Patent Application Publication (KOKAI) Hei 6-83422, for example, may be employed. An outline of this method will be given as follows. First, curved-surface patches obtained by subdividing the curved-surface, that interferes in the tool, are roughly extracted by using the worked curved-surface including sphere tree.

Then, interfering finer curved-surface patches are extracted by using the interference check based on the bilinear patch, that approximates the curved-surface patches, while subdividing the extracted curved-surface patches. The interference avoidance calculation between the resultant planar patches and the tool is executed by executing this process until the curved-surface patches are subdivided into enoughly-flat curved-surface patches.

Now, returning to the flowchart in FIG. 2, the tool path sample points obtained as above are stored temporarily in the sample point buffer portion 22 (step S4).

The tool path sample point setting unit 20 operates as above.

Figure 9:
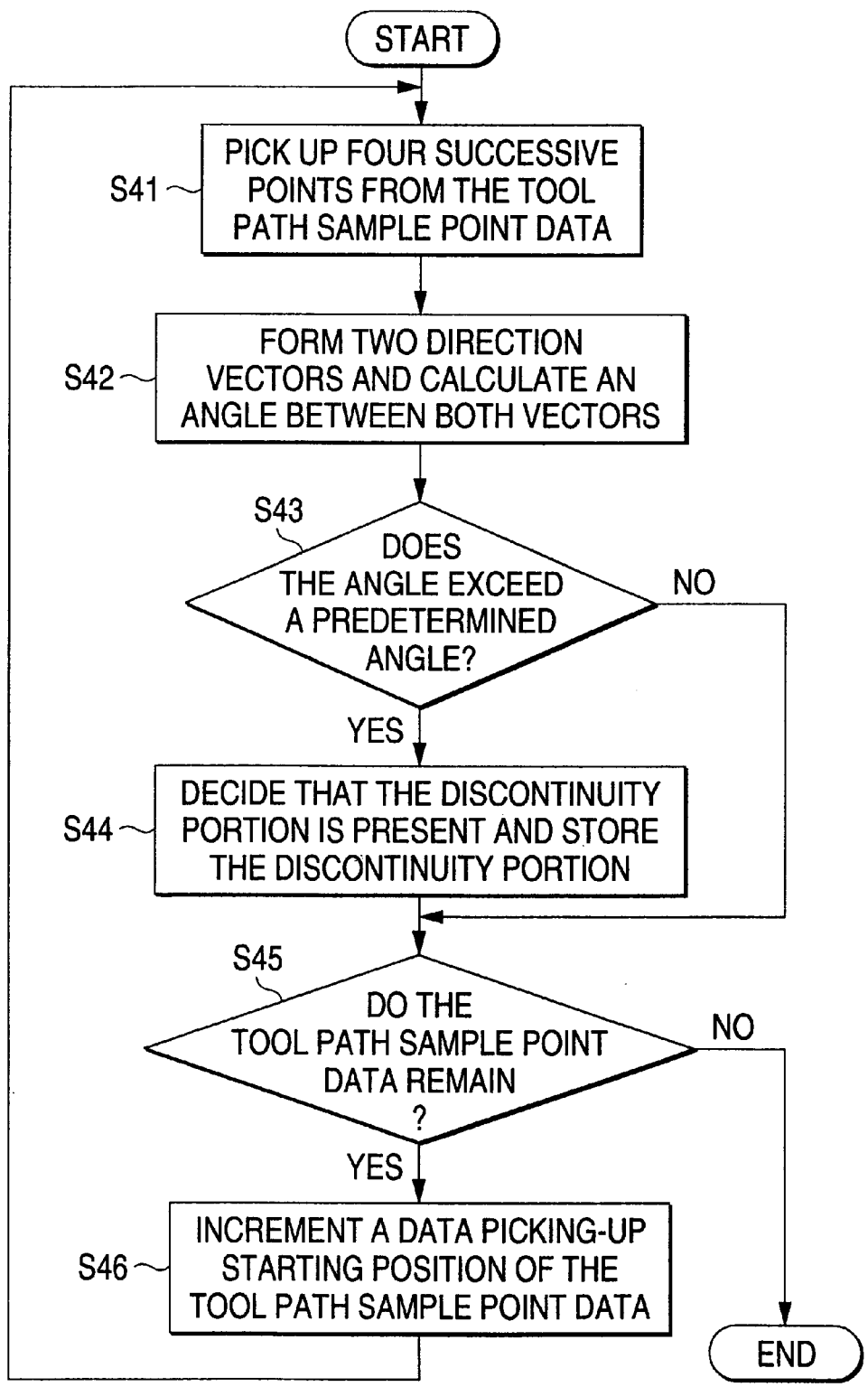
FIG. 9 is a flowchart showing details of discontinuity portion extraction of the tool path.
Figure 10A:
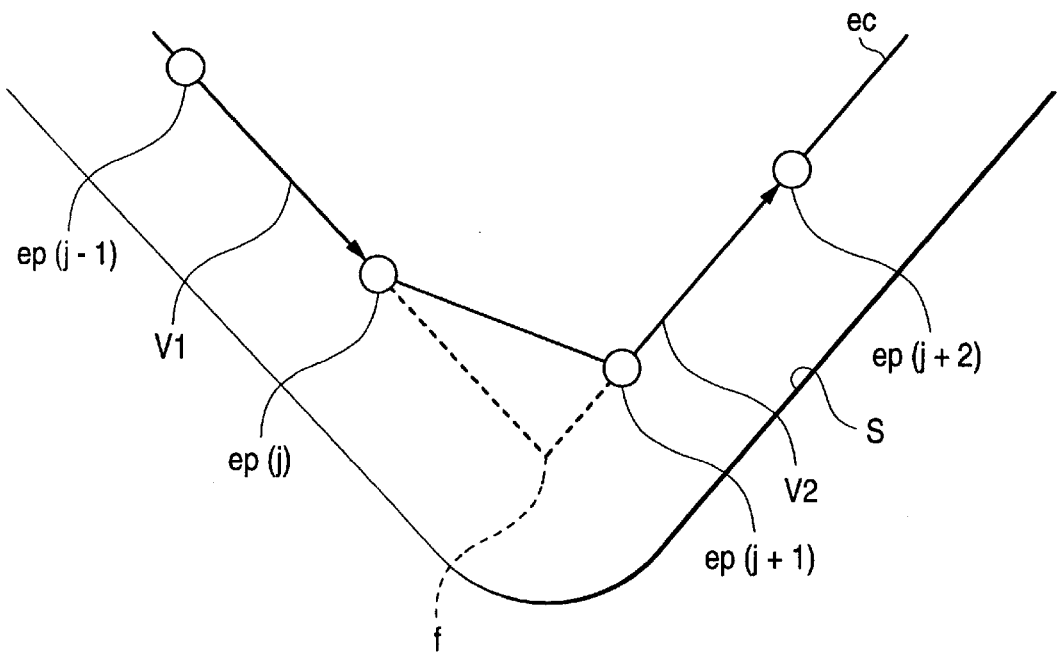
FIGS. 10A and 10B are views showing the principle of the discontinuity portion extraction.
Figure 10B:
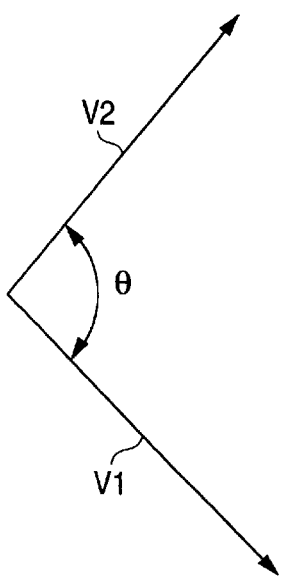
Figure 11:
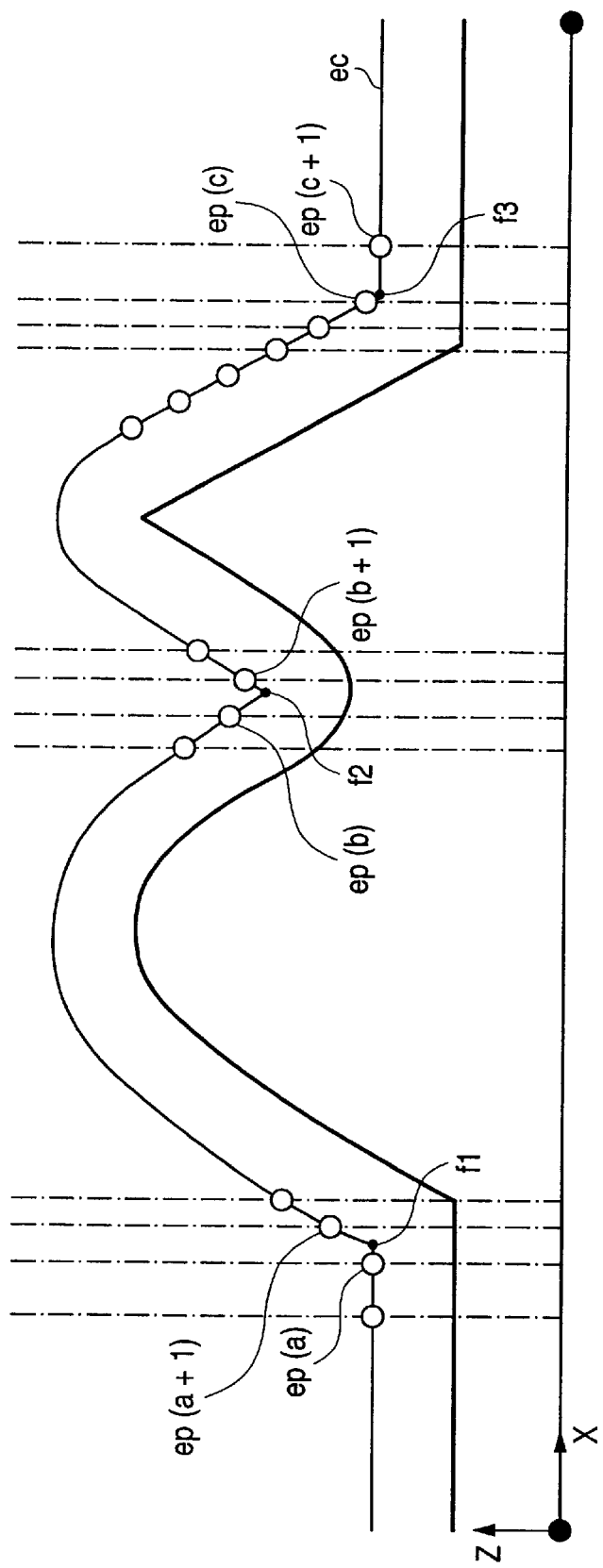
FIG. 11 is a view showing the extracted discontinuity portion.

Next, the operation of extracting the discontinuity portion in step S5 in FIG. 2 will be explained with reference to FIG. 9 to FIG. 11 hereunder. FIG. 9 is a flowchart showing an operation to extract the discontinuity portion in step S5 in FIG. 2. FIGS. 10A and 10B are views showing the principle of the discontinuity portion extraction, wherein FIG. 10A is a view showing an example of four successive points arrangement out of the tool path sample point data. FIG. 11 is a view showing the extracted discontinuity portion.

A method of extracting the discontinuity portion based on the tool path sample points ep(1), ep(2), ..., represented by a while round mark in above FIG. 8, for example, will be explained in the following. In the flowchart of FIG. 9, first four successive data are picked up from the tool path sample point data stored in the sample point buffer portion 22 (FIG. 1) of the tool path sample point setting unit 20 (step S41).

Here, it is assumed that the arrangement of four tool path sample points ep(j−1), ep(j), ep(j+1), ep(J+2) on the X, Z coordinate axes is given as shown in FIG. 10A. In this case, first a first vector V1 pointing from the tool path sample point ep(j−1) to the tool path sample point ep(j) and a second vector V2 pointing from the tool path sample point ep(j+1) to the tool path sample point ep(j+2) (FIG. 10A) are calculated, and then an angle θ between the first and second vectors V1, V2 is calculated (step S42).

If the angle θ exceeds a predetermined angle (step S43), it is decided that the discontinuity portion is present and then the discontinuity portion is stored (step S44). FIG. 11 shows the discontinuity portion that is decided in this manner. It is decided that the discontinuity portions f1, f2, f3 are present between the tool path sample points ep(a) and ep(a+1), the tool path sample points ep(b) and ep(b+1), and the tool path sample points ep(c) and ep(c+1) respectively, and then such discontinuity portions f1, f2, f3 are extracted.

In this case, an interval between the tool path sample points ep(a) and ep(a+1), an interval between the tool path sample points ep(b) and ep(b+1), and an interval between the tool path sample points ep(c) and ep(c+1) are discontinuity intervals.

In addition, it is decided whether or not unpicked-up data still remain in the tool path sample point data (step S45). If YES, a data picking-up starting position of the tool path sample point data is incremented by one, and the starting position is changed to start from the succeeding tool path sample point ep(j) (step S46). The process returns to step S41 to execute sequentially the decision of the presence of the discontinuity portion. Such decision of the presence of the discontinuity portion is carried out until the tool path sample point data to be picked up are out. The process is ended when no data remains.

With the above, the detailed operation of the discontinuity portion extracting portion 30 is completed.

Next, a detailed operation of the tool position data forming unit 40 in step S6 in FIG. 2 will be explained with reference to the flowchart of FIG. 12 hereunder.

Figure 12:
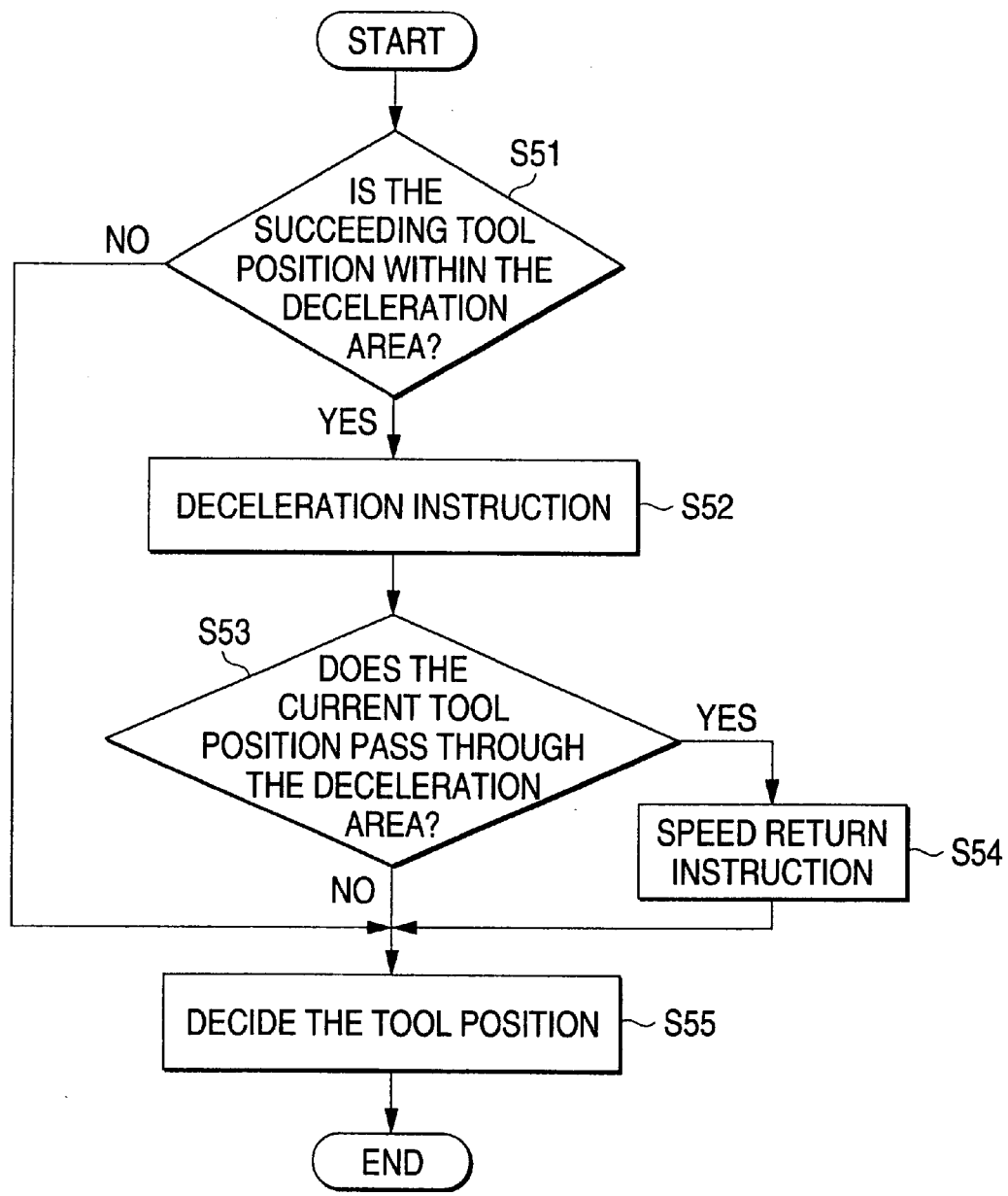
FIG. 12 is a flowchart showing an detailed operation of tool position data formation.

In the flowchart of FIG. 12, the tool position discriminating portion 41 decides whether or not the succeeding tool position enters into the deceleration area of the discontinuity interval to decelerate the tool speed to the predetermined command speed Vf (step S51). If the succeeding tool position enters into the deceleration area, the instruction to decelerate the tool speed to the predetermined command speed Vf is issued (step S52).

Meanwhile, the decision in step S51 whether or not the succeeding tool position enters into the deceleration interval may be executed as follows. For example, in FIG. 14, the discontinuity interval containing the discontinuity portion f is located between the tool path sample point ep(j) and the tool path sample point ep(j+1). If a speed at the current tool position tp(k) is assumed as Vk, a distance necessary for the deceleration may be calculated as $$Ld=(Vk-Vf)\cdot \Delta Td$$

by providing a deceleration time $\Delta Td$, for example.

Figure 14:
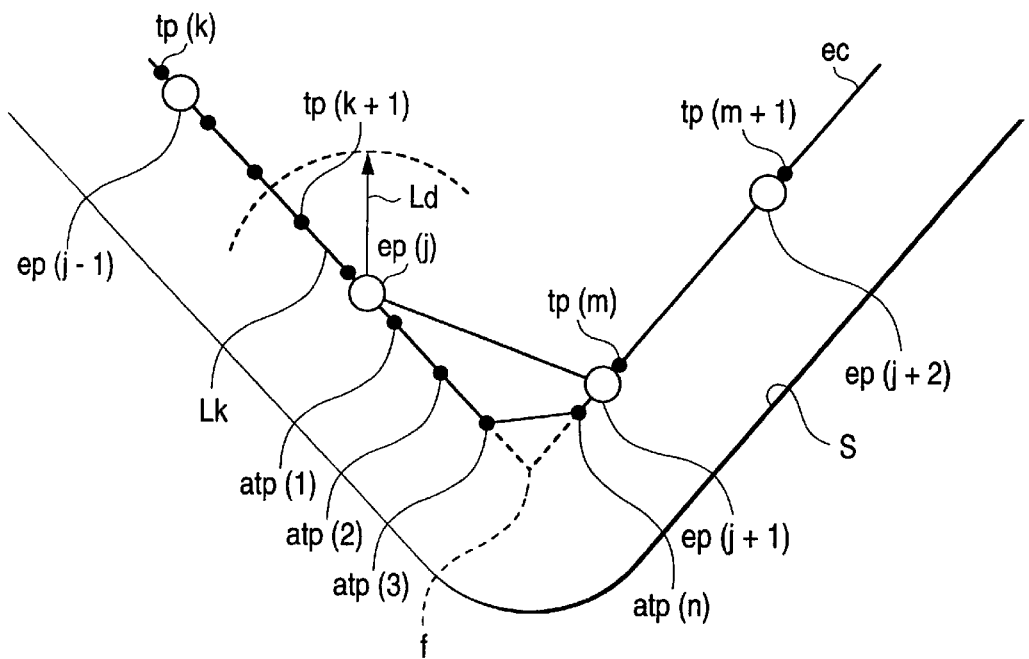
FIG. 14 is a view showing data of the tool position in vicinity of the discontinuity portion.

In contrast, in FIG. 14, for example, if the current speed Vk is not decelerated as it is, a distance $\Delta D$ from the current tool position tp(k) to the succeeding tool position tp(k+1) is given by $$\Delta D=Vk\cdot \Delta T$$

by providing the sampling interval $\Delta T$.

Also, if a distance from the current tool position tp(k) to the evaluation point ep(j) at which the deceleration must be started is assumed as d2, a distance Lk from the succeeding tool position tp(k+1) to the evaluation point ep(j)

$$Lk=d2-\Delta D.$$

Therefore, the distance Ld and the distance Lk are compared with each other, and it is decided that, if Ld<Ld, the tool position enters into the deceleration interval.

If it is decided that the tool position enters into the deceleration interval, the command speed F is decided such that the tool speed can be decelerated to the predetermined designated speed Vf until a point of time when the tool position passes through the evaluation point ep(j), and then output. Accordingly, the tool position passes through the evaluation point ep(j) at the command speed Vf. For example, if the command speed Vf is set to ¼ of the normal speed, the distance $\Delta D=Vf\cdot \Delta T$ can also be reduced to ¼.

That is, the output interval (distance) $\Delta D$ of the tool position can be set at a finer pitch in the vicinity of the discontinuity interval such as atp(1), atp(2), atp(3), ... in FIG. 14. Thus, the tool path can be provided more faithfully along the curved surface S. Accordingly, the worked surface irregularity, etc. that look like the scratch can be prevented.

The distance ΔD from the current tool position tp(k) to the succeeding tool position tp(k+1) can be given as above. A method of deciding the succeeding tool position tp(k+1) separated from the current tool position tp(k) by the distance ΔD not to cause the tool to interfere with the curved surface will be explained later.

Then, in step 53, it is decided whether or not the current tool position has already passed through the deceleration interval. If YES, a speed return instruction is issued to return the tool speed to the normal speed (step S54). The command speed deciding portion 42 decides the command speed in compliance with the command speed issued in step S52 or step S54, and then the tool position deciding portion 43 decides the tool position (step S55).

Also, because the working proceeds at the normal speed other than the neighborhood of the discontinuity interval, there is no possibility that the overall working speed is lowered to prevent the improvement of the productivity.

The decision of the tool position in the neighborhood of the discontinuity interval is made by not forming the tool path data in response to the curved surface data and then calculating the tool position based on the tool path data with the interpolation made by the numerically controlled system in the prior art, but calculating the tool position based on the curved surface data without the interpolation. Accordingly, the tool path can be set close to the ideal path by setting the working speed low in the neighborhood of the discontinuity interval.

Then, details of step S55 will be explained hereunder. First, the tool position deciding portion 43 calculates the distance ΔD=F·ΔT decided by the previously given command speed F and the sampling distance ΔT. The succeeding tool position is finally decided at a point separated by the distance ΔD after the interference avoidance calculation of the tool is executed in the same way as that described previously in step S32 in FIG. 4.

Figure 13A:
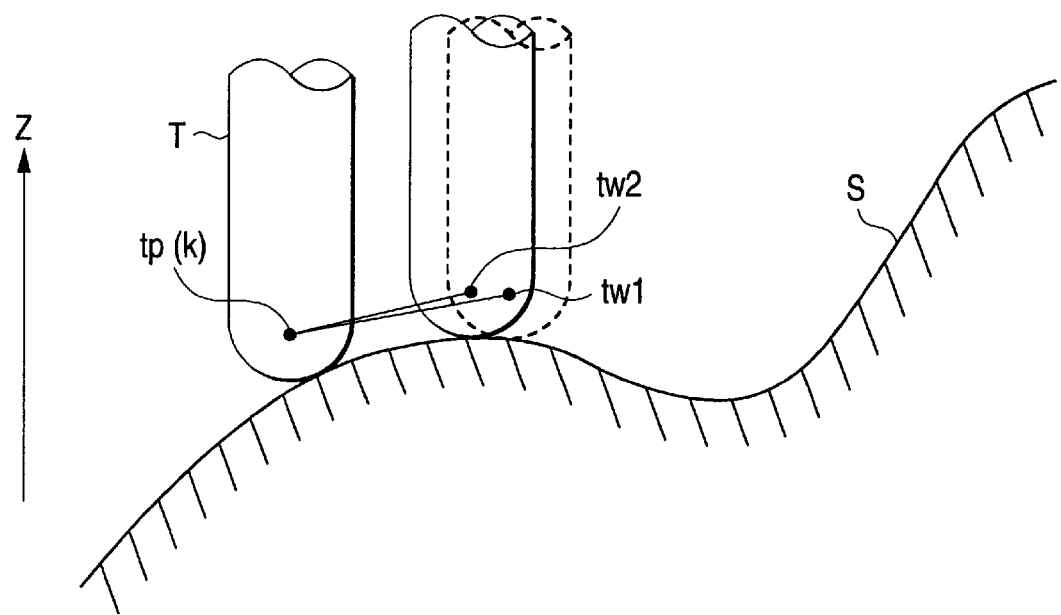
FIGS. 13A and 13B are views showing a concept of a process to calculate a succeeding tool position separated by a distance ΔD.
Figure 13B:
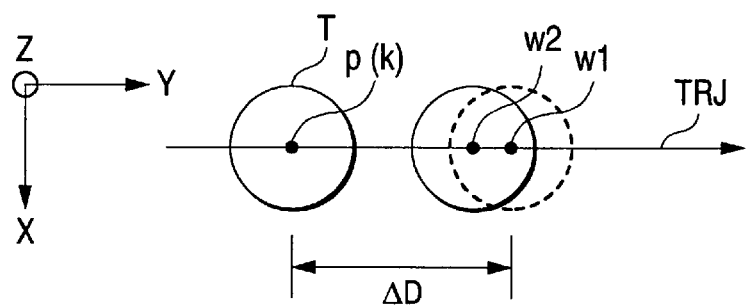

In the following, the tool position can be calculated by the totally same way as that used to calculate the tool path sample points in step S33 to step S36 in FIG. 4. FIGS. 13A and 13B show a concept to calculate the succeeding tool position from the current tool position on the curved surface. In FIG. 13B, a temporary candidate point w1 separated from the point p(k) as the current tool position by the distance ΔD on the scheduled path locus TRJ on the XY plane is calculated. A tool position tw1 obtained when the tool is virtually arranged on the X,Y axis coordinates of the temporary candidate point w1 not to interfere with the curved surface but come precisely into contact with the curved surface, as shown in FIG. 13A, is decided as the tool position candidate point.

Then, a distance ΔDt between the current tool position tp(k) and the tool position candidate point tw1 in the three-dimensional space is calculated. Then, it is decided that difference between the distance ΔDt and the distance ΔD is smaller than a predetermined infinitesimal value e. As a result, if the difference between the distance ΔDt and the distance ΔD is smaller than the predetermined infinitesimal value e, the tool position candidate point tw1 is decided as the succeeding tool position tp(k+1).

In contrast, if the difference between the distance ΔDt and the distance ΔD exceeds the predetermined infinitesimal value e, the distance ΔDt is too far to employ. Therefore, the tool position candidate point is changed into another temporary candidate point w2 that is closer to the point p(k) as the current tool position than the current temporary candidate point w1 on the scheduled path locus TRJ on the XY place. Then, the tool position candidate point is detected by calculating again the distance ΔDt between the current tool position tp(k) and the tool position candidate point tw2 in the three-dimensional space, and then the succeeding tool position tp(k+1) is decided by finding the tool position candidate point can give the difference smaller than e.

The operation of the tool position deciding portion 43 is described as above. The tool position data obtained as above are sent to a servo controller (not shown) via the tool position data buffer portion 44, and then the numerically controlled system is controlled.

The above tool interference avoidance calculating method can be carried out by the same way as that executed when the tool path sample candidate point is calculated in step S32 in FIG. 4.

Embodiment 2

Figure 15:
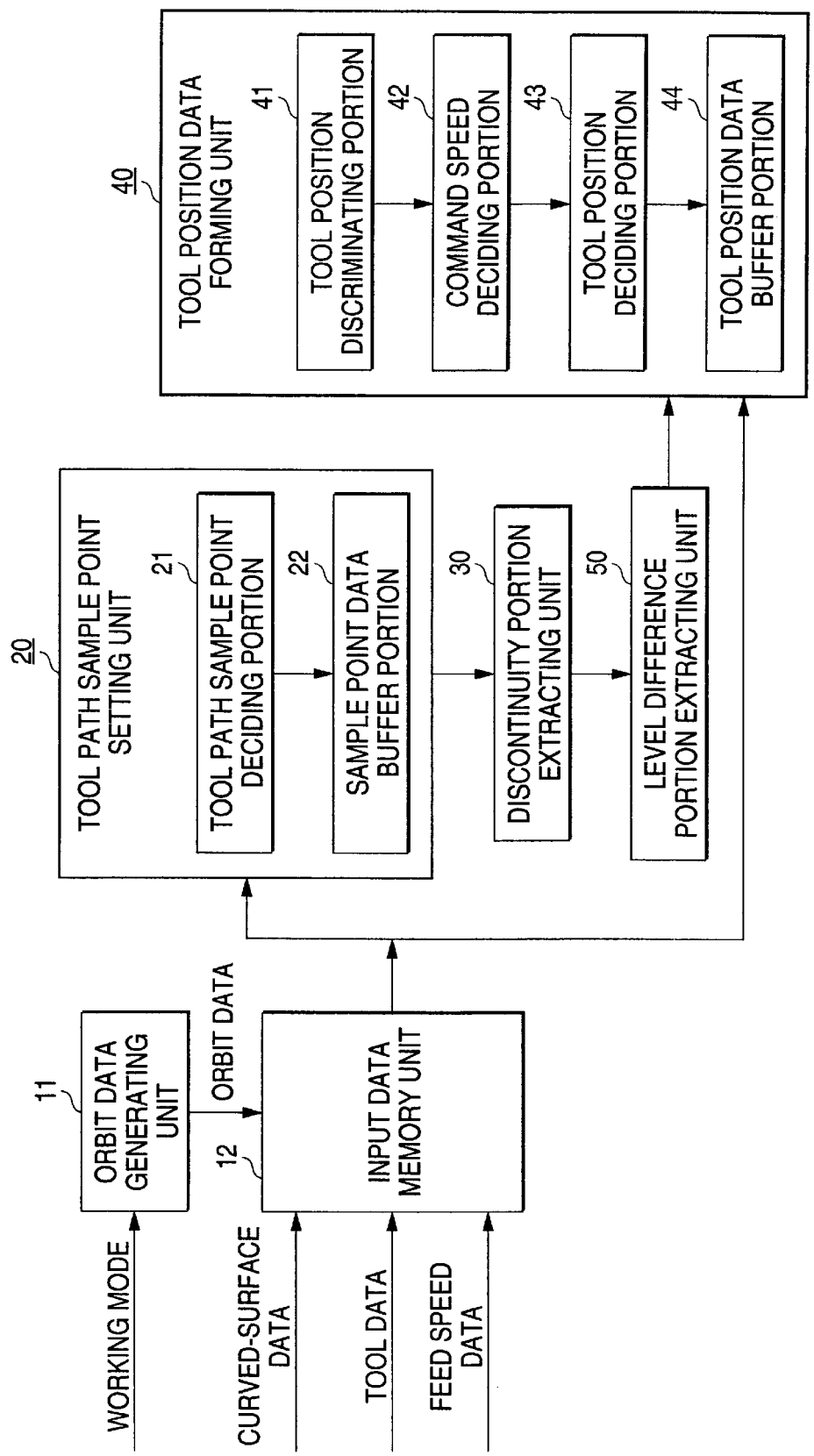
FIG. 15 is a block diagram showing a configuration of a numerically controlled system according to another embodiment of the present invention.
Figure 16A:
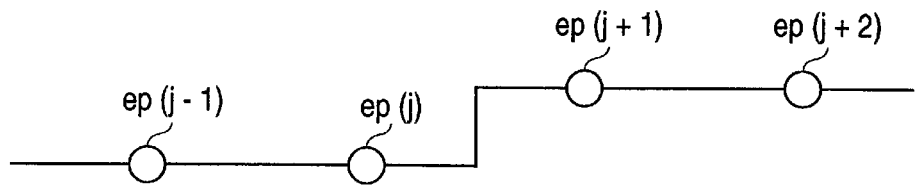
FIGS. 16A and 16B are views showing tool path sample points that are set at a level difference portion of a working object.
Figure 16B:
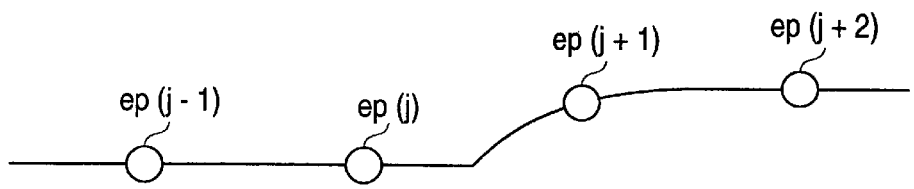
Figure 17:
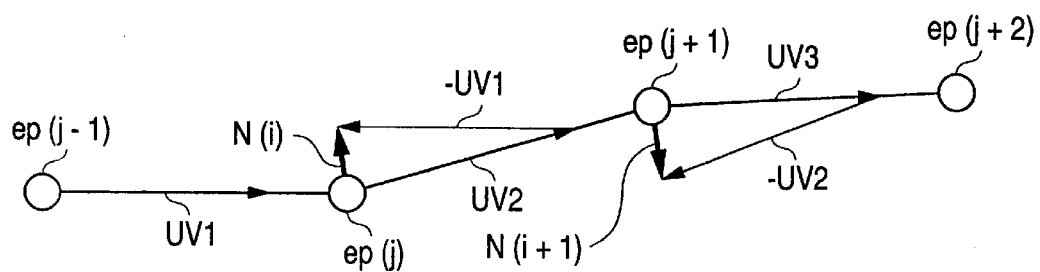
FIG. 17 is a view showing the principle of level difference extraction by a level difference portion extracting portion in FIGS. 16A and 16B.

FIGS. 15 to 17 show another embodiment of the present invention. FIG. 15 is a block diagram showing a configuration of the numerically controlled system according to another embodiment of the present invention. FIGS. 16A and 16B are views showing the situation that the tool path sample points are set on the level difference portion of the working object. FIG. 17 is a view showing the principle of discontinuity portion extraction in the level difference portion.

In FIG. 15, a level difference portion extracting portion 50 detects the level difference portion of the working object. If the working object contains a stepwise level difference portion shown in FIG. 16A or a slope-like level difference portion shown in FIG. 16B, the tool path sample points on the level difference portion (sometimes, referred simply to as "points" hereinafter) are points ep(j−1), ep(j), ep(j+1) and ep(j+2), shown in FIG. 16A and FIG. 16B respectively.

In such case, if the angle between the first vector V1 pointing from the point ep(j−1) to the point ep(j) and the second vector V2 pointing from the point ep(j+1) to the point ep(j+2) is detected in the manner shown in FIG. 10B by the discontinuity portion extracting unit 30 explained in the above embodiment 1, such angle becomes zero. As a result, the level difference portion cannot be detected.

Therefore, as shown in FIG. 15, it is possible to detect the level difference portion by providing the level difference portion extracting portion 50 in addition to the discontinuity portion extracting unit 30.

The level difference portion extracting portion 50 extracts the level difference portion as follows. As shown in FIG. 17, difference between a first unit vector UV1 pointing from the point ep(j−1) to the point ep(j) and a second unit vector UV2 pointing from the point ep(j) to the point ep(j+1) can be given as a vector N(j) pointing the upward in FIG. 17.

Also, difference between the second unit vector UV2 pointing from the point ep(j) to the point ep(j+1) and a third unit vector UV3 pointing from the point ep(j+1) to the point ep(j+2) can be given as a vector N(j+1) pointing the downward in FIG. 17.

In this way, the level difference portion can be extracted by taking account of the fact that their directions become opposite when difference vectors between the unit vectors of the vectors connecting four successive tool path sample points are detected.

Embodiment 3

Figure 18:
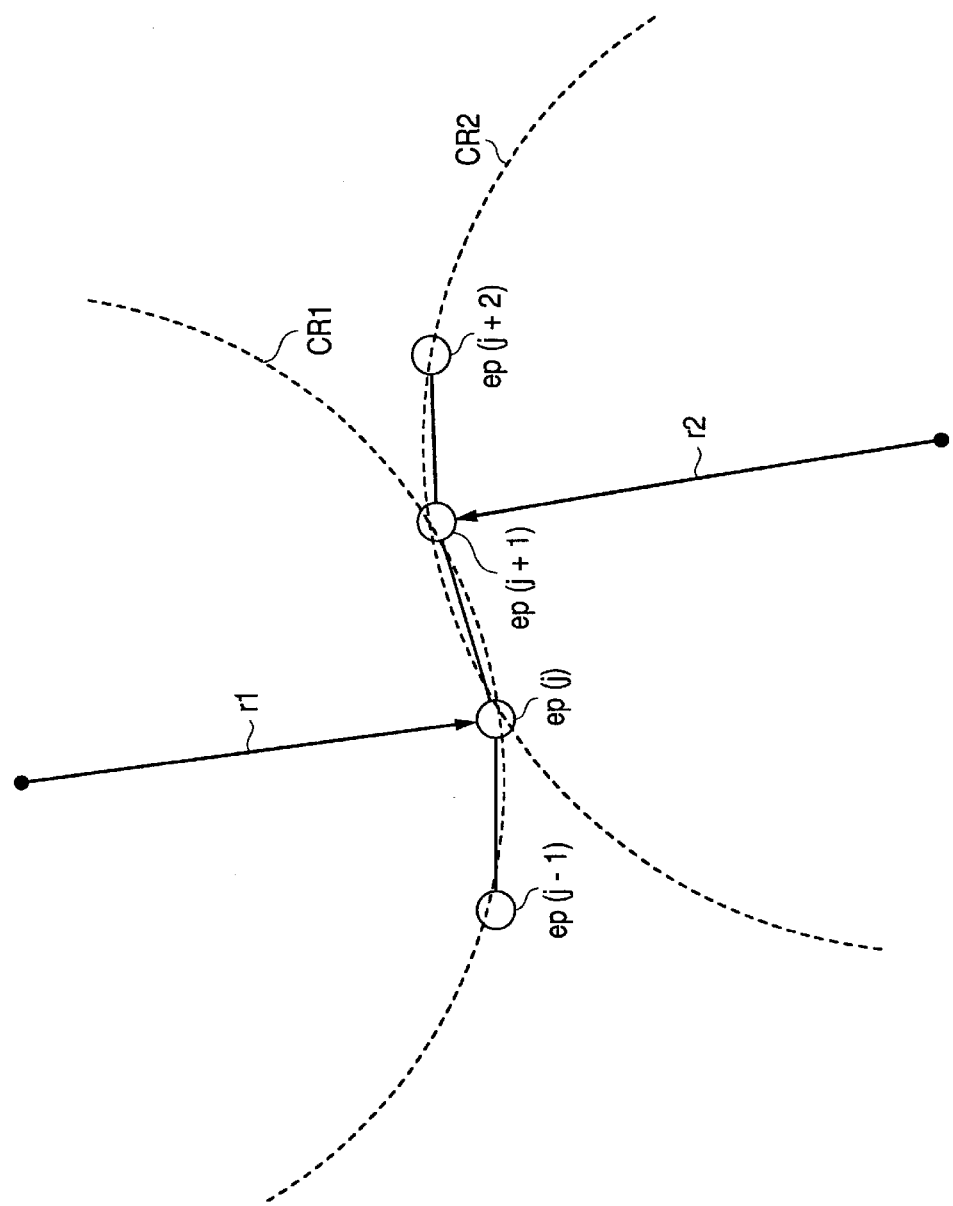
FIG. 18 is a view showing the principle of level difference extraction by another level difference portion extracting portion.
Figure 19A:
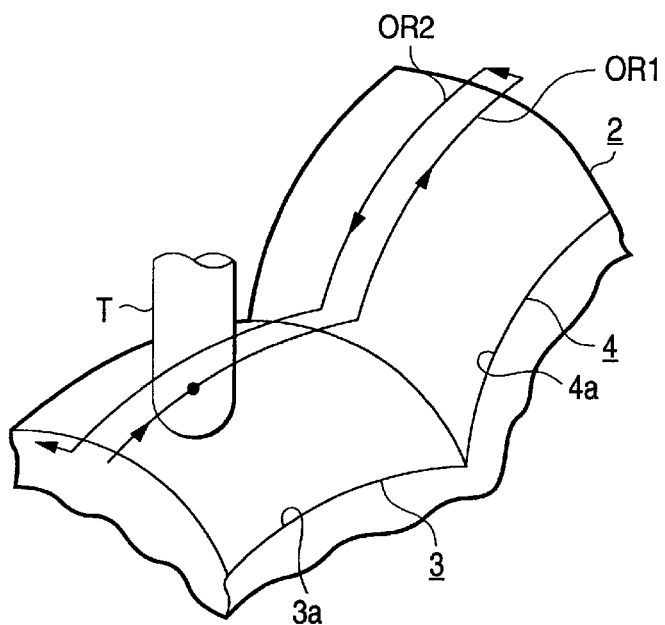
FIGS. 19A to 19C are schematic views showing the working method by the numerically controlled machine tool in the prior art.
Figure 19B:
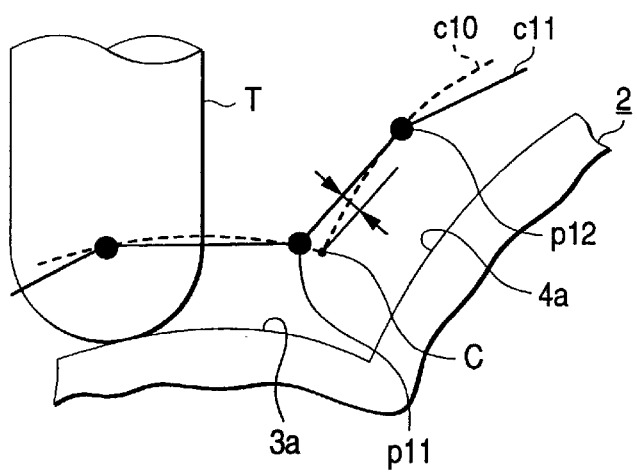
Figure 19C:
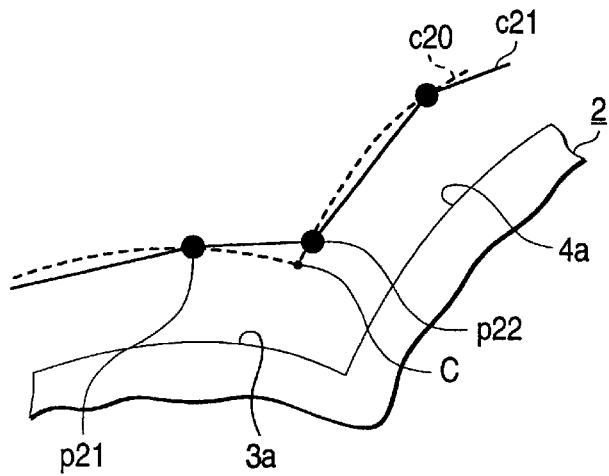

In FIG. 18 that shows the principle of discontinuity portion extraction on the level difference portion, in place of the extraction of the discontinuity portion from the angle between two vectors, a curvature vector r1 of a first circular arc CR1 passing through three successive tool path sample points, e.g., the points ep(j−1), ep(j), ep(j+1), is calculated, and also a curvature vector r2 of a second circular arc CR2 passing through the points ep(j), ep(j+1), ep(j+2) is calculated. Then, it may be decided that, if the directions of both curvature vectors r1, r2 are opposite, the discontinuity portion is present in the interval between the points ep(j) and ep(j+1).

As described above, according to this embodiment, the tool position data are formed by setting the tool path sample points in real time, then extracting the discontinuity portions, and then arranging virtually the tool to contact to the curved surface. Therefore, unlike the working method in the prior art, there is no necessity to prepare the tool path data previously by the CAD/CAM system and thus the increase of data amount can be suppressed. Also, this embodiment can easily cope with the tool change, etc. on the spot. Accordingly, the productivity can be improved.

Also, since the tool position data are formed in the neighborhood of the discontinuity portion such that the tool is arranged to contact virtually to the curved surface and the working speed is decelerated, the curved surface can be worked more faithfully in the neighborhood of the discontinuity portion such as the corner portion, etc. at which the curved surfaces are intersected with each other. Accordingly, it can be prevented that the discontinuity portion looks like the grove-like scratch or the string-like projection, and thus the improvement of the worked quality can be achieved.

In addition, as the tool path sample point data stored in the sample point buffer portion 22 of the tool path sample point setting unit 20, four pieces of data, for example, are enough to store at a minimum. Thus, the tool path sample point setting unit can be constructed inexpensively.

In the above embodiments, setting of the tool path sample points, extraction of the discontinuity portion on the tool path, and formation of the tool position data are made in real time, but the batch processing system may be employed. That is, the extraction of the discontinuity portion may be made previously by the discontinuity portion extracting unit by setting the tool path sample points by the tool path sample point setting unit 20, and then the tool position data may be formed by using the extracted information of the discontinuity portion.

In the above embodiments, normally the numerically controlled system can be implemented by the microcomputer consisting of one microprocessor. But respective tasks such as generation of the orbit data and storing of the input data, decision of the tool path sample points, extraction of the discontinuity portion, decision of the command speed, decision of the tool position, etc., for example, are shared by using the microcomputer consisting of a plurality of microprocessors, and then the process speed can be enhanced by executing these processes concurrently in real time.

In the above embodiments, the tool path sample point setting unit 20 calculates respective evaluation points by arranging virtually the tool such that the tool comes into contact with the worked surface and the distance ΔL to the succeeding evaluation point is set constant (FIG. 5B). But, in order to increase the data processing speed, the evaluation data may be calculated by setting the evaluation points at an equal interval on the scheduled path locus TRJ in FIG. 5B, for example. Also, the evaluation precision can be increased by setting the interval ΔL between the evaluation points considerably small rather than the tool feed distance ΔD=F·ΔT (see FIG. 13B).

In the above embodiments, the process applying portion of the system to be numerically controlled corresponds to the tool of the numerically controlled machine tool, but the present invention is not limited to the numerically controlled system of the machine tool. The present invention may be applied to the numerically controlled system for the robot system, etc., and can achieve the similar advantages. The robot system for executing the finishing process of the processed surface by using the grindstone as the process applying portion, for example, etc. may be considered.

The present invention can achieve advantages set forth in the following since it is constructed as mentioned above.

The numerically controlled system of the present invention comprises evaluating means for forming evaluation data, by arranging virtually a process applying portion of a system to be numerically controlled on a given scheduled path locus to come into contact with a processed surface of a processing object and by setting a plurality of evaluation points to evaluate a shape of the processed surface; discontinuity portion extracting means for extracting a discontinuity portion of a shape of the processed surface based on the evaluation data; and process applying portion position data forming means for calculating a process applying portion position by arranging virtually the process applying portion such that a moving speed of the process applying portion is decelerated to a predetermined speed in a neighborhood of the discontinuity portion and the process applying portion comes into contact with the processed surface, and then providing this calculated process applying portion position to the system to be numerically controlled.

Therefore, since the process applying portion position is calculated by arranging virtually the process applying portion such that the moving speed of the process applying portion is decelerated into the predetermined speed in the neighborhood of the discontinuity portion by extracting the discontinuity portion and the tool comes into contact with the processed surface, the process applying portion position in the neighborhood of the discontinuity portion becomes more faithful to the shape of the processed surface of the processing object and also the working quality can be improved. Also, since the process applying portion position is decided such that the process applying portion comes virtually into contact with the processed surface of the processing object, the increase of the data amount can be suppressed and the reduction in the operation efficiency can be prevented.

Also, the operations of the evaluating means, the discontinuity portion extracting means, and the process applying portion position data forming means are executed in real time. Therefore, the overall processing time can be shortened by executing these operations in real time and thus the productivity can be improved.

In addition, the discontinuity portion extracting means extracts the discontinuity portion based on three successive evaluation points or more. Therefore, the discontinuity portion can be extracted by a simple method.

Further, the discontinuity portion extracting means extracts the discontinuity portion based on an angle between a first vector pointing from a first evaluation point to a second evaluation point and a second vector pointing from a third evaluation point to a fourth evaluation point, and first to fourth evaluation points consist of four successive evaluation points. Therefore, the discontinuity portion can be easily extracted by such simple method.

Furthermore, the discontinuity portion extracting means extracts the discontinuity portion based on a direction of a first difference vector between a first unit vector pointing from a first evaluation point to a second evaluation point and a second unit vector pointing from the second evaluation point to a third evaluation point and a direction of a second difference vector between the second unit vector and a third unit vector pointing from the third evaluation point to a fourth evaluation point, and first to fourth evaluation points consist of four successive evaluation points. Therefore, the level difference portion as the discontinuity portion can be easily extracted.

Besides, the discontinuity portion extracting means calculates a first curvature vector in a neighborhood of three evaluation points of first, second, and third evaluation points out of four successive evaluation points and a second curvature vector in a neighborhood of three evaluation points of second, third, and fourth evaluation points, and then extracts the discontinuity portion based on the first curvature vector and the second curvature vector. Therefore, the discontinuity portion can be easily extracted by taking account of the curvature vectors.

Moreover, the numerically controlling method of the present invention comprises the steps of forming evaluation data by arranging virtually a process applying portion of a system to be numerically controlled on a given scheduled path locus to come into contact with a processed surface of a processing object and by setting a plurality of evaluation points to evaluate a shape of the processed surface; extracting a discontinuity portion of a shape of the processed surface based on the evaluation data; calculating a process applying portion position by arranging virtually the process applying portion such that a moving speed of the process applying portion is decelerated to a predetermined speed in a neighborhood of the discontinuity portion and the process applying portion comes into contact with the processed surface; and providing this calculated process applying portion position to the system to be numerically controlled. Therefore, since the process applying portion position is calculated by arranging virtually the process applying portion such that the moving speed of the process applying portion is decelerated into the predetermined speed in the neighborhood of the discontinuity portion by extracting the discontinuity portion and the tool comes into contact with the processed surface, the process applying portion position in the neighborhood of the discontinuity portion becomes more faithful to the shape of the processed surface of the processing object and also the working quality can be improved. Also, since the process applying portion position is decided such that the process applying portion comes virtually into contact with the processed surface of the processing object, the increase of the data amount can be suppressed and the reduction in the operation efficiency can be prevented.

What is claimed is:

1. A numerically controlled system comprising:
   an evaluating section forming evaluation data, by arranging, virtually, a processing portion of a system that is numerically controlled, on a scheduled path locus, to contact a surface of an object to be processed, and by setting a plurality of evaluation points to evaluate shape of the surface;
   a discontinuity extracting section extracting a discontinuity in the shape of the surface, based on the evaluation data; and
   a position data forming section calculating position of the processing portion by arranging, virtually, the processing portion such that moving speed of the processing portion is decelerated to a predetermined speed in a neighborhood of the discontinuity and when the processing portion comes into contact with the surface, and providing the processing portion position calculated to the system that is numerically controlled.

2. The numerically controlled system according to claim 1, wherein operations of said evaluating section, said discontinuity portion extracting section, and said position data forming section are executed in real time.

3. The numerically controlled system according to claim 1, wherein said discontinuity extracting section extracts the discontinuity based on at least three successive evaluation points.

4. The numerically controlled system according to claim 3, wherein said discontinuity extracting section extracts the discontinuity based on an angle between a first vector pointing from a first evaluation point to a second evaluation point and a second vector pointing from a third evaluation point to a fourth evaluation point, the first to fourth evaluation points including four successive evaluation points.

5. The numerically controlled system according to claim 3, wherein said discontinuity extracting section extracts the discontinuity based on a direction of a first difference vector representing a distance between a first unit vector pointing from a first evaluation point to a second evaluation point and a second unit vector pointing from the second evaluation point to a third evaluation point, and a direction of a second difference vector representing a difference between the second unit vector and a third unit vector pointing from the third evaluation point to a fourth evaluation point, the first to fourth evaluation points consisting of four successive evaluation points.

6. The numerically controlled system according to claim 3, wherein said discontinuity extracting section calculates a first curvature vector in a neighborhood of first, second, and third evaluation points chosen from four successive evaluation points, and a second curvature vector in a neighborhood of the second evaluation point, the third evaluation point, and a fourth evaluation point, and extracts the discontinuity based on the first curvature vector and the second curvature vector.

7. A numerical control method comprising:
   forming evaluation data by arranging, virtually, a processing portion of a system that is numerically controlled, on a scheduled path locus to contact a surface of an object to be processed, and by setting a plurality of evaluation points to evaluate shape of the surface;
   extracting a discontinuity in the shape of the surface, based on the evaluation data;
   calculating position of the processing portion by arranging, virtually, the processing portion such that a moving speed of the processing portion is decelerated to a predetermined speed in a neighborhood of the discontinuity and when the processing portion comes into contact with the surface; and
   providing the processing portion position calculated to the system for numerical control.

8. The numerical control method according to claim 7 including, in real time, forming evaluation data, extracting a discontinuity, calculating position of the processing portion, and providing the processing portion position.

9. The numerical control method according to claim 7 including extracting the discontinuity based on at least three successive evaluation points.

10. The numerical control method according to claim 9 including extracting the discontinuity based on an angle between a first vector pointing from a first evaluation point to a second evaluation point and a second vector pointing from a third evaluation point to a fourth evaluation point, the first to fourth evaluation points including four successive evaluation points.

11. The numerical control method according to claim 9 including extracting the discontinuity based on a direction of a first difference vector representing a distance between a first unit vector pointing from a first evaluation point to a second evaluation point and a second unit vector pointing from the second evaluation point to a third evaluation point, and a direction of a second difference vector representing a difference between the second unit vector and a third unit vector pointing from the third evaluation point to a fourth evaluation point, the first to fourth evaluation points consisting of four successive evaluation points.

12. The numerical control method according to claim 9 including extracting the discontinuity by calculating a first curvature vector in a neighborhood of first, second, and third evaluation points chosen from four successive evaluation points, and a second curvature vector in a neighborhood of the second evaluation point, the third evaluation point, and a fourth evaluation point, and extracting the discontinuity based on the first curvature vector and the second curvature vector.

* * * * *